United States Patent
Wheeler et al.

(10) Patent No.: US 6,513,161 B2
(45) Date of Patent: Jan. 28, 2003

(54) MONITORING SYSTEM FOR RECORDING DEVICE

(75) Inventors: Henry B. Wheeler, St. Petersburg, FL (US); Daozheng Lu, Dunedin, FL (US)

(73) Assignee: Nielsen Media Research, Inc., Schaumburg, IL (US)

( * ) Notice: Subject to any disclaimer, the term of this patent is extended or adjusted under 35 U.S.C. 154(b) by 0 days.

(21) Appl. No.: 09/859,764

(22) Filed: May 17, 2001

(65) Prior Publication Data

US 2002/0026635 A1 Feb. 28, 2002

Related U.S. Application Data (62) Division of application No. 08/786,270, filed on Jan. 22, 1997.

(51) Int. Cl.[7] .................................................. H04H 9/00
(52) U.S. Cl. .......................................... 725/14; 725/21
(58) Field of Search ................... 725/21, 9, 14, 725/18, 19; 348/180

(56) References Cited

U.S. PATENT DOCUMENTS

| | | | |
|---|---|---|---|
| 3,372,233 A | 3/1968 | Currey | 178/69.5 |
| 3,845,391 A | 10/1974 | Crosby | 325/64 |
| 3,919,479 A | 11/1975 | Moon et al. | 179/1 |
| 4,025,851 A | 5/1977 | Haselwood et al. | 325/31 |
| 4,622,583 A | 11/1986 | Watanabe et al. | 358/84 |
| 4,633,302 A | 12/1986 | Damoci | 358/84 |
| 4,639,779 A | 1/1987 | Greenberg | 358/142 |
| 4,697,209 A | 9/1987 | Kiewit et al. | 358/84 |
| 4,764,808 A | 8/1988 | Solar | 358/84 |
| 4,847,685 A | 7/1989 | Gall | 358/84 |
| 4,885,632 A | * 12/1989 | Mabey et al. | 356/84 |
| 4,907,079 A | * 3/1990 | Turner et al. | 358/84 |
| 4,912,552 A | * 3/1990 | Allison, III et al. | 358/84 |
| 5,165,069 A | 11/1992 | Vitt et al. | 358/335 |
| 5,294,977 A | 3/1994 | Fisher et al. | 348/4 |
| 5,425,100 A | 6/1995 | Thomas et al. | 380/20 |
| 5,481,294 A | 1/1996 | Thomas et al. | 348/1 |
| 5,495,282 A | 2/1996 | Mostafa et al. | 348/5 |
| 5,512,933 A | 4/1996 | Wheatley et al. | 348/5 |
| 5,526,427 A | 6/1996 | Thomas et al. | 380/20 |
| 5,572,246 A | 11/1996 | Ellis et al. | 348/4 |
| 5,608,445 A | 3/1997 | Mischler | 348/4 |
| 5,889,548 A | 3/1999 | Chan | 348/4 |

FOREIGN PATENT DOCUMENTS

| | | |
|---|---|---|
| EP | 0 161 512 A1 | 4/1985 |
| EP | 0 195 639 A2 | 3/1986 |
| EP | 0 210 609 A2 | 7/1986 |
| EP | 0 703 683 A2 | 3/1996 |
| FR | 2 717 025 | 9/1995 |
| WO | WO 88/10540 | 12/1988 |
| WO | WO 93/22875 | 11/1993 |
| WO | WO 95/12278 | 5/1995 |

OTHER PUBLICATIONS

International Search Report for PCT/US 97/97/09218, dated Jan. 26, 1998.
International Search Report for PCT/US 97//09218, dated Oct. 17, 1997.
International Search Report for PCT/US 94/11795, dated Feb. 24, 1995.

* cited by examiner

*Primary Examiner*—Victor R. Kostak
(74) *Attorney, Agent, or Firm*—Katten Muchin Zavis Rosenman (57) ABSTRACT

A system determines an operating mode of a recording/playing device. The device generates a recording indicating signal during recording and operates in conjunction with a receiver. The system includes a tuning means for tuning to a program signal; four signal acquiring means for acquiring four signals; and determining means coupled to all four signal acquiring means for determining an operating mode of the device, based on the four acquired signals. The first of the four signals is acquired from an output of the device. The second signal is acquired from an output of the tuner. The third signal is acquired from an output of the receiver. The fourth signal is the recording indicating signal.

14 Claims, 4 Drawing Sheets

| VCR Operation | Is erase signal present? | Do outputs from VCR & tuner match? | Do outputs from VCR & TV probe match? | Signal to use |
|---|---|---|---|---|
| Record (& view at same time) | Yes | Match | Match | VCR outputs |
| Record (not viewed during recording) | Yes | Match | No match | Both VCR outputs 54, 56 and scanned tuner output 67 |
| Play | No | No match | Match | VCR outputs 54, 56 |
| Tune w. VCR, or use fast forward or rewind functions | No | Match | Match | VCR outputs 54, 56 |
| OFF or TV mode | No | No match | No match | Scanned tuner output 67 |

FIG. 4

MONITORING SYSTEM FOR RECORDING DEVICE

This is a Divisional of U.S. application Ser. No. 08/786,270, filed Jan. 22, 1997.

FIELD OF THE INVENTION

The invention relates to the field of television audience research, and more particularly, to the detection of the viewing of television signals originating from a signal source within a statistically sampled household.

DESCRIPTION OF PRIOR ART

As disclosed by Thomas et al., in U.S. Pat. No. 5,481,294, which is assigned to the same assignee as the present invention and the disclosure of which is herein incorporated by reference, the signal (i.e., television or radio), that has been selected, and is being viewed or heard, by an audience member on a television or radio receiver in a statistically selected household, may be determined by ascertaining the channel to which the tuner of the television or radio is tuned. This channel information is stored locally for subsequent retrieval by a central data collection office. The central data collection office matches the retrieved channel information against a cable/station record which indicates which station corresponds to which channel and/or against a program record list of television or radio programs which were transmitted on that channel in order to determine the television or radio program that the audience member selected. As noted in U.S. Pat. No. 5,481,294 by Thomas et al., this process becomes cumbersome as the number of signal sources, the number of channels, the changes to channel mappings at a cable head-end, and/or the number of television or radio programs increase, and can fail to produce usable data if there is an error in the program record list that provides the concordance between channels and programs.

Several approaches have been proposed that are intended to avoid the cumbersome cable/station record and/or program record list manner of keeping track of which station and/or which programming is available from which signal source and channel within a sampled household. As an example, one such approach has employed a program monitoring system that reads an identifying code embedded in the program, and uses the ancillary code to identify the program to which the television or radio was tuned.

As another example, a program signature is extracted from the program signal selected for use (i.e., for viewing if the signal is a television signal, or for listening if the signal is a radio signal) in the sampled household and is later compared to previously extracted reference signatures in an effort to match the program signature to a previously extracted reference signature in order to thereby identify the selected program. Accordingly, this signature approach is a correlation system which uses a sample frequency that is less than the frequency of the program signal.

Such monitoring equipment in the sampled household also stores a time stamp in addition to the ancillary code or program signature. The time stamp is used to determine the time and date of viewing and/or listening relative to the selected program.

Thomas et al., in U.S. Pat. Nos. 5,425,100, and 5,526,427, both of which are assigned to the same assignee as the present invention, teach a hierarchical, multi-level encoding system for identifying a transmitted program by reading an ancillary program identifying code which is sequentially added to the program as it passes through various stages of a program distribution network. The disclosures of U.S. Pat. Nos. 5,425,100 and 5,526,427 are hereby incorporated by reference. Other program monitoring systems employing ancillary codes which are embedded in a transmitted program are taught by Hasel-wood et al. in U.S. Pat. No. 4,025,851, and by Crosby in U.S. Pat. No. 3,845,391.

A program monitoring system that exclusively relies on ancillary codes may produce inaccurate results when ancillary codes are either intentionally or accidentally omitted from program signals. Even when the original program signal is encoded with an ancillary code, there is a risk that the ancillary code will be intentionally removed before the program signal is viewed or heard. There is also the risk that ancillary codes may be accidentally removed before the program in which they are embedded is viewed or heard. For example, ancillary codes that are embedded in video or audio program signals so that they are undetectable to a viewer or listener, or so that they are at least unobtrusive enough to be no more than minimally detectable by a viewer or listener, are commonly stripped from the video or audio program signals when the video or audio program signals are compressed (e.g., such as by the MPEG II compression scheme used with digital television signals).

Moreover, ancillary codes, which are inserted into vertical blanking intervals (VBI) of the video portions of program signals, and which survive passage through the signal transmission chain so as to be received by a user's television receiver, are commonly removed from the video before the video is applied to the CRT of a television. As a result, non-intrusive acquisition of these VBI ancillary codes is impractical because such non-intrusive acquisition usually requires the use of probes which generally pick up the video sent by the tuner to the CRT after the VBI ancillary codes have already been stripped from the video.

Therefore, ancillary codes in the vertical blanking interval are more easily detected if the monitored television receiver is opened so that leads of the monitoring equipment can be soldered to video test points of the television receiver at which the ancillary codes are still present. However, such an arrangement is intrusive, leading to objections by the members of the statistically sampled households.

Signal comparison program monitoring systems, other than signature matching systems such as those described above, have also been used in order to determine the signal sources (e.g., channels) of the programs being viewed or heard. One of the oldest known signal comparison program monitoring systems compares a synchronization component of a television program signal selected by a television tuner with a corresponding synchronization component in a program signal selected by a reference tuner. This signal comparison program monitoring system credits viewing to the signal source selected by the reference tuner when and if the two synchronization components match within some predetermined error.

Currey, in U.S. Pat. No. 3,372,233, provided an early teaching of such a program monitoring system which compared the phasing of vertical synchronization signals for this purpose. Currey's approach was not particularly successful because there are times when the vertical synchronization components from different signal sources occasionally match. When this type of matching occurs, the program source measurement is ambiguous. Solar, in U.S. Pat. No. 4,764,808, and Gall, in U.S. Pat. No. 4,847,685, provided improved synchronization component measurement systems that did not entirely overcome the basic shortcoming of the Currey approach. In U.S. Pat. No. 5,294,977, Fisher et al.

disclosed a synchronization component based measurement system operating in a restricted environment in which such phase coincidences can be avoided.

Another signal comparison program monitoring system correlates a receiver signal, which may be extracted from a receiver being monitored, with a reference signal, which may be supplied by a reference tuner that is tuned consecutively to the possible program signal sources to which the monitored receiver may be tuned. This correlation system determines the channel being viewed or heard when the correlation between the receiver signal from the monitored receiver and the reference signal from the reference tuner exceeds some predetermined value. This monitoring approach was initially adapted for the purpose of in-home identification of viewed television programs by Kiewit et al. in U.S. Pat. No. 4,697,209, the disclosure of which is herein incorporated by reference. The teachings of Kiewit et al. have been expanded upon by Thomas et al., in U.S. Pat. No. 5,481,294, who described the use of signatures extracted from either a video component or an audio component of a receiver signal, and who discussed the operational advantages of using non-invasive sensors to acquire the components.

A further comparison program monitoring system was placed in commercial service in 1984 by the A. C. Nielsen Company and was internally referred to as the Real Time Correlation (RTC) system. The RTC system used a combination of (i) vertical synchronization component matching and (ii) audio correlation in order to identify an unknown signal. The RTC system did so by first making a preliminary identification based upon matching of vertical synchronization components. However, this preliminary identification would not be unique if the unknown transmitted signal, for example, was one of several sync-locked signals originating at a local cable head-end. Therefore, the RTC system resolved ambiguities by correlating the audio component of the selected transmitted signal from the monitored television with the audio component of the reference signal from the reference tuner whose synchronization component matched the synchronization component of the transmitted signal.

Correlation program monitoring systems are generally more robust and less affected by signal degradation than are code reading program monitoring systems. Even so, a signal correlation program monitoring system, which compares two signals (e.g., a receiver signal selected by a monitored television at a television viewing site in a statistically sampled household, and a reference signal selected by a reference tuner at a different local reference site), works best when the two signals to be correlated are both high quality replicas of what was actually transmitted. If one of the correlated signals, such as the receiver signal selected by the monitored television, is acquired by a non-intrusive sensor at the television viewing site, and if the other correlated signal, such as the reference signal selected by the reference tuner, is acquired from the audio or video circuitry of a tuner at a different local reference site, artifacts introduced by the non-intrusive measurement at the television viewing site may have a substantial adverse impact on the correlation between the receiver and reference signals. To reduce such artifacts, Thomas et al., in the aforementioned U.S. Pat. No. 5,481,294, teach the suppression or removal of background noise from an audio signal acquired by a non-intrusive microphone at the receiver viewing or listening site.

Another problem facing signal correlation systems is that, because signal correlation systems require an on-going collection of reference signatures by equipment dedicated to monitoring the signals transmitted from each program signal source in whatever regional market is being measured, the operating cost of a signature-based program monitoring system is generally higher than that of a comparable program monitoring system relying on ancillary codes.

A problem facing all, or nearly all, program monitoring systems arises from signal sources which originate within the household itself. Signal sources of this sort may include computers or video games, which use the monitored television's display, and video cassette (or tape) recorders, which play program signals that were recorded at earlier times or that are recorded on rental cassettes (or tapes). The use of such local signal sources is, with one exception to be discussed below, systematically excluded from a long-established audience measurement parameter called "Households Using Television" (HUT) because the use of a television receiver with a locally generated signal does not fall within the scope of conventional television audience measurements.

Moreover, if a local signal source is not identified as such, a program monitoring system could either (i) erroneously count viewing or listening based on this local signal source as it would count viewing or listening based upon a remote signal source, or (ii) label the viewing or listening based on the local signal source as an unidentified activity. Either way, viewing or listening based upon a local signal source would be included as contributions to the overall HUT value reported by the program monitoring system in such a way as to create ambiguities.

The exception mentioned above relates to recording of programs by VCRs for later time shifted viewing. The reportable HUT value generally counts time-shifting viewing either at the time of recording or at the time of playback, but does not count at both recording and playback. By not counting at both recording and playback, double counting is avoided. Also, whether counting is done at the time of recording or at the time of playback, program monitoring systems strive to count only transmitted programs and seek to avoid counting non-transmitted programs, such as rented movies.

Also, a VCR typically has a number of modes in a non-record mode. For example, in a monitor mode, the VCR is used to pass through a currently selected transmitted program signal so that the signal may be viewed on a television, but the VCR does not concurrently record the signal. In a tune/record mode, the VCR is used to pass through a currently selected transmitted program signal for both viewing and recording. In a non-tune/record mode, the VCR is used to record a program without concurrent viewing of the program on a television; thus, the program is recorded for time-shifted playing. In a play mode, the VCR is used to play transmitted materials, and as tune-shifted recordings, and non-transmitted materials, such as rented movies. In an off mode, the VCR is off. Because of this number of modes, a VCR presents one of the most difficult program monitoring challenges.

Early measurements of VCRs in sampled households involved monitoring of both the control switches and the tuners of VCRs. This monitoring resulted in the measurement of recording, which was credited to program ratings when recorded, and in the identification of all other uses as not contributing to program ratings. Thus, for example, when recording was counted as HUT viewing, all play activity was counted as non-HUT usage). These early measurements of VCRs involved a complicated and expensive disassembly and modification of consumers' equipment in order to physically connect switch monitoring equipment to the VCR switches.

Subsequent improvements in VCR measurement provided less invasive, and in some cases entirely non-invasive, ways of acquiring the requisite signals. In U.S. Pat. No. 4,633,302, Damoci teaches a method of picking up an artifact from the output of a VCR's erase-head in order to ascertain that the measured VCR is recording a tuned signal. Vitt et al., in U.S. Pat. No. 5,165,069, teach a further improved measurement method in which all the status information (including a sensed erase-head output, which is commonly selected by different manufacturers to be a continuous wave (CW) tone lying between thirty and seventy-five KHz) is acquired from a sensor or pickup located immediately adjacent to, but externally of, the VCR's housing. The disclosure of Vitt et al. is herein incorporated by reference. Mostafa et al., in U.S. Pat. No. 5,495,282, teach yet another non-invasive arrangement for monitoring the operation of a VCR by injecting encoded identification signals into the VCR and searching for that signal in the RF output from the VCR. Yet the monitoring of VCRs continue to be a difficult problem.

The present invention solves one or more of the above-noted problems.

SUMMARY OF THE INVENTION

In accordance with one aspect of the present invention, a system for identifying a signal source supplying a program signal to a monitored receiver comprises program signature extracting means and signal source identifying means. The monitored receiver is located in a household. The program signature extracting means extracts a reference program signature representative of an output of the monitored receiver and extracts a source program signature representative of the program signal supplied by the signal source. The program signature extracting means is located in the household. The signal source identifying means identifies the signal source as a source of the program signal in response to the reference program signature and the source program signature.

In accordance with another aspect of the present invention, a system for identifying which of first and second signal sources is supplying a program signal to a monitored receiver comprises program signature extracting means and signal source identifying means. The first and second signal sources and the monitored receiver are located in a household. The program signature extracting means extracts a reference program signature representative of an output of the monitored receiver and extracts first and second source program signatures representative of an output of the first and second signal sources. The program signature extracting means is located in the household. The signal source identifying means identifies which of the first and second signal sources is a source of the program signal in response to the reference program signature and the first and second source program signatures.

In accordance with yet another aspect of the present invention, a system for identifying a program tuned by a monitored receiver comprises tuning means, program signature extracting means, signature correlating means, and code reading means. The monitored receiver is located in a household. The tuning means is separate from a tuner of the monitored receiver and tunes to programs tunable by the monitored receiver. The tuning means is located in a household. The program signature extracting means is operably coupled to the monitored receiver and to the tuning means, and extracts a first program signature from an output of the monitored receiver and a second program signature from an output of the tuning means. The signature correlating means correlates the first and second program signatures. The code reading means is operably coupled to the tuning means and reads an ancillary code from the output of the tuning means if the signature correlating means detects a match between the first and second program signatures.

In accordance with still another aspect of the present invention, a system for determining an operating mode of a recording/playing device comprises tuning means, first, second, third, and fourth signal acquiring means, and determining means. The recording/playing device generates a recording indicating signal during recording and operates in conjunction with a receiver. The tuning means is separate from a tuner of the receiver and tunes to a program signal. The first signal acquiring means acquires a first signal from an output of the recording/playing device. The second signal acquiring means acquires a second signal from an output of the tuning means. The third signal acquiring means acquires a third signal from an output of the receiver. The fourth signal acquiring means acquires the recording indicating signal. The determining means is coupled to the first, second, third, and fourth signal acquiring means and determines an operating mode of the recording/playing device dependent upon the first,.second, and third signals and the recording indicating signal.

In accordance with a further aspect of the present invention, a system for measuring the use of a video recorder operably connected to a television receiver comprises source tuning means, television receiver signal acquiring means, and first and second comparing means. The television receiver receives a plurality of transmitted television signals. The source tuning means tunes to a source program signal corresponding to a transmitted television signal. The television receiver signal acquiring means acquires a signal displayed on the television receiver. The first comparing means compares a signal from the video recorder to the source program signal. The second comparing means compares the signal from the video recorder to the signal acquired by the television receiver signal acquiring means.

In accordance with yet a further aspect of the present invention, a method of determining the source of a signal selected for use by a user at a monitored receiver in a household comprises the steps of: (a) selecting, by means of a source receiver, a source signal corresponding to a channel; (b) acquiring, by use of a non-intrusive sensor disposed proximate to the monitored receiver, a representation of the signal selected by the user; (c) comparing the representation of the signal selected by the user to the source signal in order to determine a difference between the representation and the source signal; (d) if the difference is less than a predetermined amount, identifying the representation as the source signal; (e) if the difference is not less than a predetermined amount, controlling the source receiver to receive a source signal corresponding to another channel and repeating steps (c) and (d).

In accordance with a still further aspect of the present invention, a method of reading an ancillary code operably associated with a user selected program signal transmitted from one of a plurality of program channels to which a household receiver in a household is tuned comprises the steps of: (a) acquiring the user selected program signal from the household receiver; (b) acquiring a source program signal from a predetermined one of the plurality of program channels; (c) comparing the source program signal to the user selected program signal and, if the source program signal and the user selected program signal differ by less than a predetermined amount, reading the ancillary code from the source program signal.

In accordance with another aspect of the present invention, a method of identifying which of first and second signal sources is supplying a program signal to a monitored receiver, wherein the first and second signal sources and the monitored receiver are located in a household, comprises to following steps: (a) comparing a sync signal from an output of one of the first and second signal sources to a sync signal from an output of the monitored receiver; (b) if the sync signal from an output of one of the first and second signal sources matches the sync signal from an output of the monitored receiver, extracting a reference program signature representative of the output of the monitored receiver and a signature representative of the output of the one of the first and second signal sources; (c) identifying which of the first and second signal sources is a source of the program signal if the reference program signature and the signature representative of the output of the one of the first and second signal sources match; and (d) if the sync signal from an output of the one of the first and second signal sources does not match the sync signal from an output of the monitored receiver, comparing a sync signal from an output of another of the first and second signal sources to a sync signal from an output of the monitored receiver and repeating steps (b) and (c) as necessary.

DETAILED DESCRIPTION OF THE PREFERRED EMBODIMENT

A television audience measurement system 10 of the sort taught by Thomas et al. in U.S. Pat. No. 5,481,294 is depicted schematically in FIG. 1. Programs transmitted from a plurality of program transmitters 12 (which are depicted in the drawing as over-the-air transmitters, but which may include any transmitter of program signals such as CATV, direct satellite broadcast, and/or the like) are received at a statistically selected household 14. The same program signals from the same program transmitters 12 are also received by a local monitoring site 16. Generally, although not necessarily, the local monitoring site 16 of the television audience measurement system 10 is located in a corresponding regional market being measured, and serves a plurality of statistically selected households, such as the statistically selected household 14, which are located within that regional market. All such statistically selected households communicate their data to a central site 18.

Figure 1:
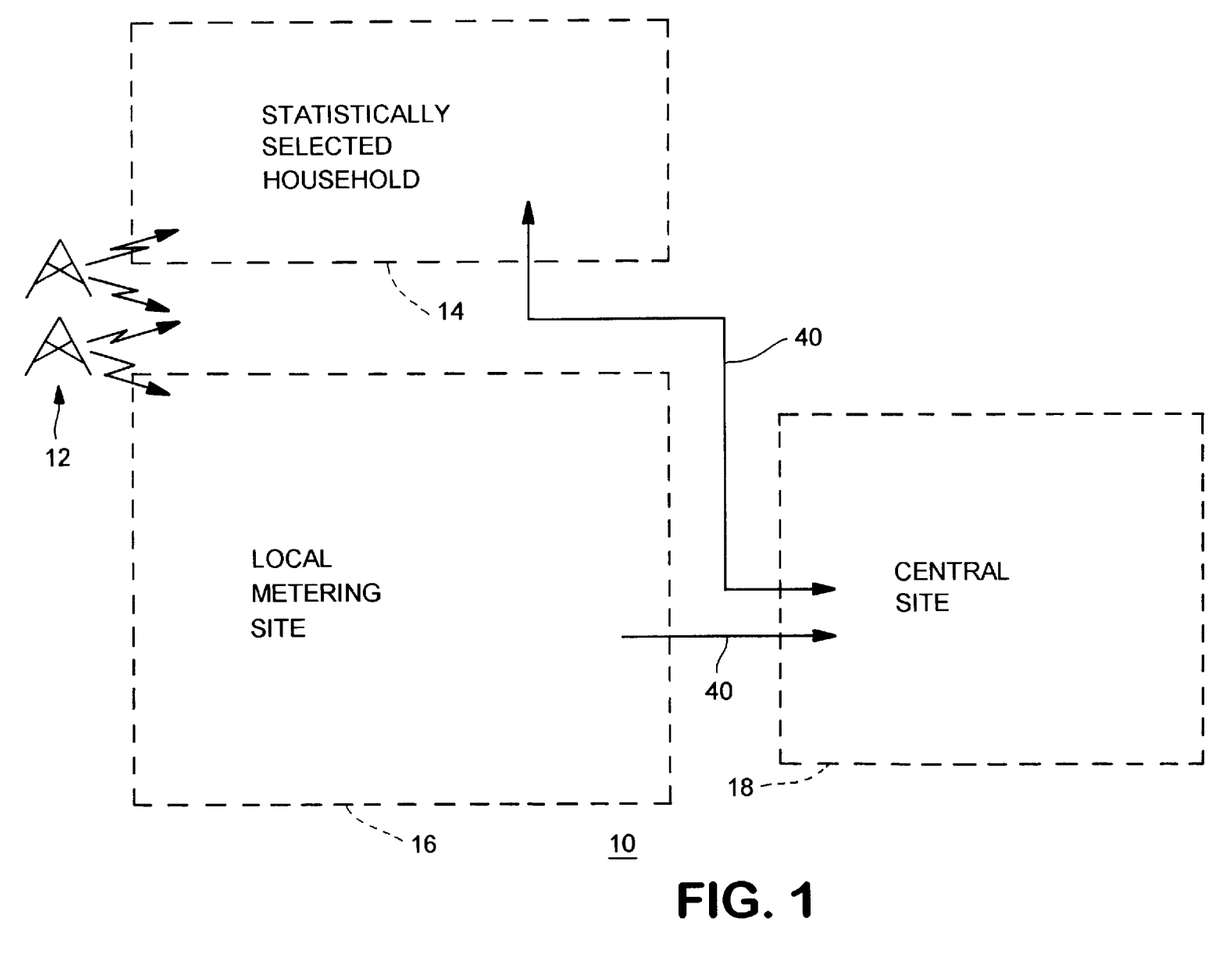
FIG. 1 is a schematic illustration showing the components of a prior art television audience measurement system which is improved by the present invention.

Also, there may be a plurality of regional markets each having a corresponding local monitoring site 16 and each local monitoring site 16 serving a plurality of corresponding statistically selected households 14. All such statistically selected households and all such local monitoring sites communicate their data to the central site 18.

Data, which may comprise identifying ancillary codes transmitted with the programs transmitted by the program transmitters 12, or which may comprise program signatures characteristic of such programs, are extracted from the received transmitted programs by both the statistically selected household 14 and the local monitoring site 16, and the extracted data are sent from both the statistically selected household 14 and the local monitoring site 16 to the central site 18. The central site 18 compiles television audience reports based upon this data from the statistically selected household 14 and the local monitoring site 16 as well as from all other statistically selected households located within the receiving area of the local monitoring site 16, from all other statistically selected households located within the receiving areas of all other corresponding local monitoring sites, and from all other local monitoring sites.

In general accordance with the teachings of Thomas et al. in U.S. Pat. No. 5,481,294, the portion of the television audience measurement system 10 located within the statistically selected household 14 is shown in more detail in FIG. 2. As shown therein, the program transmitters 12 transmit RF program signals to a signal input 20, which is generally shown as an antenna but which may be any other type of program signal input, such as a cable input, a satellite dish, and/or the like. The program signals received by the signal input 20 may comprise a plurality of channels of television programming and are routed to one or more television receivers 22, 22' of the statistically selected household 14.

Figure 2:
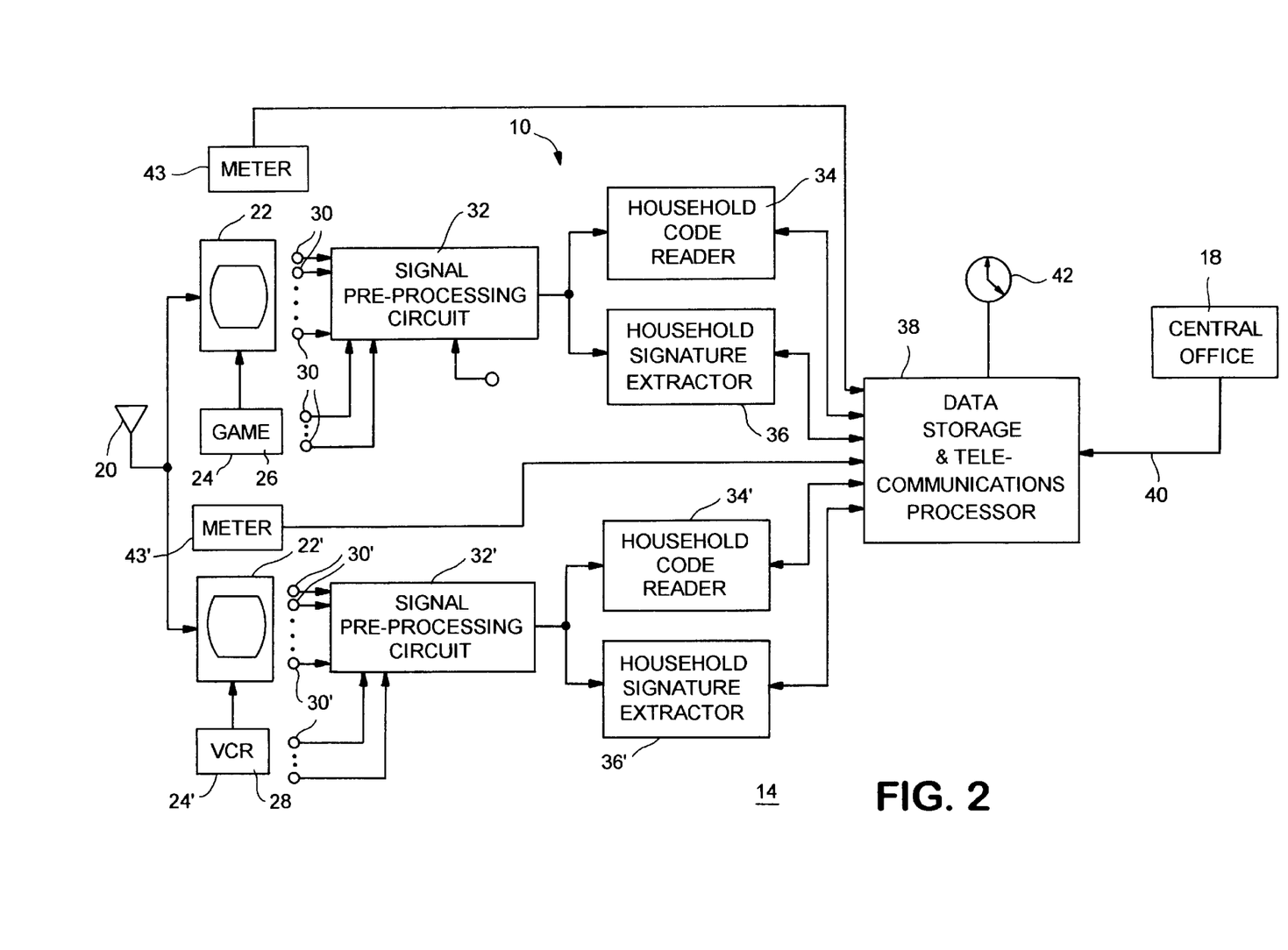
FIG. 2 illustrates in greater detail the statistically selected household of FIG. 1 as measured in accordance with the prior art.

Each of the television receivers 22, 22' may have associated with it a corresponding local (i.e., non-transmitted) video signal source 24, 24'. For example, the local video signal source 24 associated with the television receiver 22 may be a video game 26, and the local video signal source 24' associated with the television receiver 22' may be a VCR 28. The local video signal sources 24, 24' may be configured to send their output video signals to their corresponding television receivers 22, 22'.

Non-invasive signal sensors 30, such as microphones, photodetectors, inductive pickups, and/or the like, are arranged, and are located, to acquire representations of the program signals selected for viewing on the television receiver 22. These representations are preprocessed by a preprocessing circuit 32 in a manner, for example, described in the aforementioned U.S. Pat. No. 5,481,294. The preprocessed representations are passed to a code reader 34 and to a signature extractor 36. The code reader 34 and the signature extractor 36 produce program identifying data from the preprocessed representations. Thus, for example, the code reader 34 reads ancillary codes from the preprocessed representations, and the signature extractor 36 extracts signatures from the preprocessed representations.

The program identifying data extracted by the code reader 34 and the signature extractor 36 are sent to a data storage and telecommunication processor 38 for subsequent transmission by way of a transmission medium 40 to the central site 18. Also, as is well known in the art, a local clock 42 associated with the data storage and telecommunication processor 38 is conventionally synchronized with a master clock at the central site 18 whenever data are transferred between the statistically selected household 14 and the central site 18 over the transmission medium 40. The transmission medium 40, for example, may be the public switched telephone network.

Similarly, non-invasive signal sensors 30' are arranged, and are located, to acquire representations of the program signals selected for viewing on the television receiver 22'. These representations are preprocessed by a preprocessing circuit 32'. The preprocessed representations are passed to a code reader 34' and to a signature extractor 36'. The code reader 34' and the signature extractor 36' produce program identifying data from the preprocessed representations. Thus, for example, the code reader 34' reads ancillary codes from the preprocessed representations, and the signature extractor 36' extracts signatures from the preprocessed representations. The program identifying data read by the code reader 34' and extracted by the signature extractor 36' are sent to the data storage and telecommunication processor 38 for subsequent transmission to the central site 18.

A people meter 43 may also be associated with the television receiver 22. The people meter 43 may be any of the people meters used by Nielsen Media Research, Inc. to meter the viewing habits of panelists, and generally determines the channel being viewed and the identities of the viewers of the television receiver 22. Also, a people meter 43' may be associated with the television receiver 22'. The people meter 43' may be similar to the people meter 43.

Figure 3:
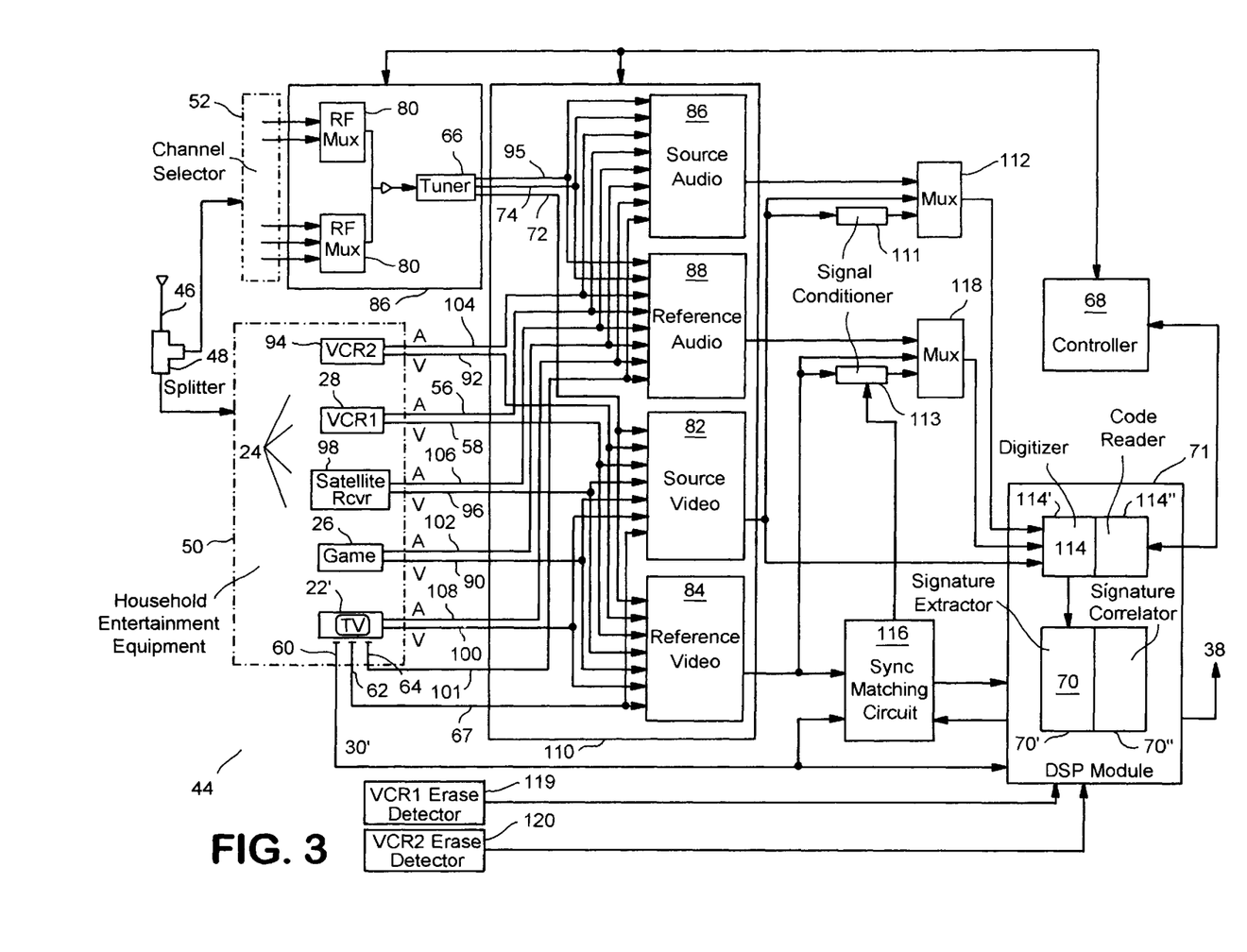
FIG. 3 is a schematic block diagram of a preferred embodiment of the present invention; and, FIG. 4 is a state table summarizing VCR measurements which may be made using the apparatus of FIG. 3.

FIG. 3 illustrates a program signal source detector 44 which may be used for the portion of the television audience measurement system 10 located within the statistically selected household 14 as shown in FIG. 2 and which is suitable for accurately determining a local source of signals, such as the VCR 28, being displayed on a monitored television, such as the television receiver 22'. If desired, the local metering site 16 may be eliminated. However, the local metering site 16 may be desirable in those markets where no one statistically selected household receives all of the possible signals that are available in the market in which the statistically selected household 14.

As shown in FIG. 3, a signal input 46, which is generally shown as an antenna but which may be any program signal input, such as a cable input, a satellite dish, and/or the like, receives the program signals transmitted by the program transmitters 12. The program signals received by the signal input 46 may comprise a plurality of channels of television programming. The program signals received by the signal input 46 may be split by a splitter 48 so as to be fed to both household entertainment equipment 50 and a channel selection apparatus 52. It should be noted here that, in determining the local source of video and/or audio being displayed by the television receiver 22', the output of the television receiver 22' is the reference signal, and the output of the channel selection apparatus 52, the game 26, the VCR 28, etc. is the source signal. The household entertainment equipment 50 and the channel selection apparatus 52 are located within the statistically selected household 14. As is known, a user of the household entertainment equipment 50 may choose from among many various interconnections in order to route a selected signal to a television and/or other equipment. In the interest of clarity of presentation, however, these various interconnections, which may be made by the user, are not shown in FIG. 3.

In some cases, the selected signal is routed through the VCR 28 and then supplied to its associated television receiver 22'. This routing is commonly done at RF via a suitable cable from an RF output of the VCR 28 to an RF input of the television receiver 22', but the signal may also be supplied to the television receiver 22' as a baseband audio signal from a VCR baseband audio output of the VCR 28 and/or as a baseband video signal from a VCR baseband video output of the VCR 28. For purposes of the program signal source detector 44, however, a VCR audio output 56 of the VCR 28 may be a baseband audio output of the VCR 28, and a VCR video output 58 of the VCR 28 may be a baseband video output of the VCR 28.

In one mode of operation of the VCR 28, hereinafter called the "TV mode," the RF signals from the signal input 46 are supplied directly to the television receiver 22', and the VCR 28 is not involved in the tuning process. The VCR 28 is in this mode whenever it is unpowered. In another mode, hereinafter called "VCR TUNE," a tuner within the VCR 28 is used to select one of the plurality of program signals received by the signal input 46 and to supply that selected signal as an output of the VCR 28 to its television receiver 22'. In a further mode, hereinafter called "PLAY," a signal stored on a video cassette (or tape) is supplied by the VCR 28 to its television receiver 22'. In yet a further mode, hereinafter called "RECORD," a program signal is recorded by the VCR 28 for later, time shifted viewing.

When the VCR 28 is in the RECORD mode, its erase head is powered so as to erase whatever old signal may be on the cassette (or tape) before the new signal is recorded. The operation of the erase head can be detected by finding some artifact of the erase head tone. As noted by Vitt et al. in U.S. Pat. No. 5,165,069, this detection may be done in a non-invasive manner with an inductive sensor installed adjacent to the VCR 28. It also has been also found that an artifact of the erase head signal can often be detected directly from the VCR audio output 56 of some models of the VCR 28. The manner of detecting the erase head signal depends on the specific model of the VCR 28 being monitored. If an artifact of the erase head signal cannot be detected directly from the VCR audio output 56 of the VCR 28, the program signal source detector 44 may employ an input from a radiated signal pickup (not shown) of the sort disclosed by Vitt et al.

As shown in FIG. 3, three of the non-invasive signal sensors 30' are employed to acquire representations of various signal components from the television receiver 22', whenever it is turned on. These three non-invasive signal sensors may include (i) a suitable sync signal pickup 60 which may be of the type disclosed in copending application Ser. No. 08/654,309 filed on May 28, 1996, which is disposed adjacent the television receiver 22', and which picks up a representation of the vertical and horizontal synchronization pulses of the television receiver 22', (ii) a video signal pickup 62 which may be of the type disclosed in the aforementioned copending application Ser. No. 08/654,309 filed on May 28, 1996 and which is arranged to pick up a representation of the video signal being displayed by the television receiver 22', and (iii) an audio signal pickup 64, which may be a microphone as taught by Thomas et al. in U.S. Pat. No. 5,481,294 and which is used to acquire the audio portion of the displayed program signal for subsequent matching operations.

It is noted that the video signal pickup 62 may not, and probably does not, acquire the full video signal (some attenuation at the higher frequencies and the lowest frequencies is common), but the failure of the video signal pickup 62 to acquire the full video signal is of no particular concern in the overall measurement system of the present invention because the matching operations disclosed hereinafter can be conducted using only mid-frequency components of the various video signals. It is also noted that the video signal pickup 62 may not, and probably does not, acquire the information contained in the vertical blanking interval of the video signal because the video signal pickup 62 is preferably located near the CRT of the television receiver 22' and because the vertical blanking interval is commonly not supplied to the CRT video of the television receiver 22'. Accordingly, ancillary codes located in the vertical blanking interval cannot be read from the output of the video signal pickup 62. It will be understood to those skilled in the art that both the video signal pickup 62 and the audio signal pickup 64 may employ appropriate circuitry (not separately shown) to match their output levels to the industry standard output levels of the signals obtained from the VCR video output 58 and the VCR audio output 56 against which they are matched.

If the television receiver 22' is a television model provided with an external video jack, such an external video jack can be used in lieu of the video signal pickup 62 and the sync signal pickup 60. Similarly, if the television receiver 22' is a television model provided with an external audio jack, such an external audio jack can be used in lieu of the audio signal pickup 64.

The channel selection apparatus 52 of the program signal source detector 44 employs a source scanning tuner 66. The source scanning tuner 66 has access to the signal input 46 by means of the splitter 48 and may scan all of the available programming channels under control of a controller 68. The controller 68 may be a PIC 16c65 that is slaved to a digital signal processor 70 (which may be a Texas Instrument model TMS 320C32-60) of a digital signal processing module 71. The digital signal processor 70 may be considered to have a signature extraction portion 70' and a signature correlating portion 70". The source scanning tuner 66 provides a video output 72 and one or two audio outputs 74 and 95 (the second of these being associated with a Secondary Audio Program (SAP) signal component of some television transmissions) that are subsequently used in matching operations in order to determine the source of the signals displayed on the television receiver 22'.

As depicted in FIG. 3, the program signal source detector 44 is capable of (i) extracting an audio program signature from a program signal, (ii) extracting a video program signature from the program signal, (iii) extracting an audio ancillary code from the program signal, and (iv) extracting a video ancillary code from the program signal. Any one or more of these detection functions may be used in order to identify the local source of the signals displayed by the television receiver 22'. For example, the tuner of the television receiver 22' may be identified as the source of the signals being displayed by the television receiver 22' if a reference audio signature extracted from an audio output of the television receiver 22' matches a source audio signature extracted from an audio output of the source scanning tuner 66 or if a reference video signature extracted from a video output of the television receiver 22' matches a source video signature extracted from a video output of the source scanning tuner 66.

Similarly, the VCR 28 may be identified as the local source of the signals being displayed by the television receiver 22' if a reference audio signature extracted from an audio output of the television receiver 22' matches a source audio signature extracted from an audio output of the VCR 28 or if a reference video signature extracted from a video output of the television receiver 22' matches a source video signature extracted from a video output of the VCR 28, the game 26 may be identified as the local source of the signals being displayed by the television receiver 22' if a reference audio signature extracted from an audio output of the television receiver 22' matches a source audio signature extracted from an audio output of the game 26 or if a reference video signature extracted from a video output of the television receiver 22' matches a source video signature extracted from a video output of the game 26, and so The channel selection apparatus 52 may receive a plurality of RF program signals in addition to the RF program signals received by the signal input 46. For example, these other program signals may include off-air channels received by an antenna other than the antenna 46, channels received by way of a CATV cable (which may be received directly, or which may be received through a cable converter), channels received by a satellite dish, and/or the like. The program signals received by the signal input 46 and the other program signals described above are connected through RF multiplexers 80 to the input of the source scanning tuner 66 under control of the controller 68.

The video output 72 from the source scanning tuner 66 is applied to both a source video multiplexer 82 and a reference video multiplexer 84, while the audio output 74 and the second audio program (SAP) output 95 from the source scanning tuner 66 are applied to both a source audio multiplexer 86 and a reference audio multiplexer 88. Also applied to both the source video multiplexer 82 and the reference video multiplexer 84 are (i) the VCR video output 58 from the VCR 28, (ii) a video output 90 from the video game 26, (iii) a VCR video output 92 from a second VCR 94 which might also be used with the television receiver 22', (iv) a video output 96 from a Direct Broadcast Satellite receiver 98, and (v) a video output 100 from the television receiver 22'. Similarly, applied to both the source audio multiplexer 86 and the reference audio multiplexer 88 are (i) the VCR audio output 56 from the VCR 28, (ii) an audio output 102 from the video game 26, (iii) a VCR audio output 104 from the second VCR 94, (iv) an audio output 106 from the Direct Broadcast Satellite receiver 98, and (v) an audio output 108 from the television receiver 22'. The source video multiplexer 82, the reference video multiplexer 84, the source audio multiplexer 86, and the reference audio multiplexer 88 comprise an input multiplexer module 110. Additionally, the video signal pickup 62 is applied to the source video multiplexer 82 and to the reference video multiplexer 84, and the audio signal pickup 64 is applied to the source audio multiplexer 86 and to the reference audio multiplexer 88.

The output from the source video multiplexer 82 is connected through a video signal conditioner circuit 111 and a multiplexer 112 to one input of a digitizer 114' and then to the signature extraction portion 70' of the digital signal processor 70. Similarly, the output from the reference video multiplexer 84 is connected through a video signal conditioner circuit 113 and a multiplexer 118 to one input of the digitizer 114' and then to the signature extraction portion 70' of the digital signal processor 70. The signature extraction portion 70', similarly to the signature extractor 36 of FIG. 2, extracts video program signatures from signals on selected ones of the inputs of the source video multiplexer 82 and the reference video multiplexer 84. Accordingly, the signature correlation portion 70" may correlates reference video signatures extracted from a video output of the television receiver 22' to source video signatures extracted from a video output of the game 26, a video output of the VCR 28, a video output of the source scanning tuner 66, a video output of the second VCR 94, and/or a video output of the Direct Broadcast Satellite receiver 98, in order to determine whether the tuner of the television receiver 22', the game 26, the VCR 28, the second VCR 94, or the Direct Broadcast Satellite receiver 98 is the source of the signals being displayed by the television receiver 22'.

The output from the source video multiplexer 82 is also connected directly through the multiplexer 112 and the digitizer 114' to a code reader 114". Similarly, the output from the reference video multiplexer 84 is also connected directly through the multiplexer 118 and the digitizer 114' to the code reader 114". The code reader 114" may be similar to the code reader 34 of FIG. 2. The code reader 114"

extracts an ancillary code from a signal on a selected one of the inputs of the source video multiplexer 82 and/or on a selected one of the inputs of the reference video multiplexer 84.

The output from the source audio multiplexer 86 is connected through the multiplexer 112 to one input of the digitizer 114' and then to the signature extraction portion 70' of the digital signal processor 70. Similarly, the output from the reference audio multiplexer 88 is connected through the multiplexer 118 to one input of the digitizer 114' and then to the signature extraction portion 70' of the digital signal processor 70. The signature extraction portion 70' extracts audio program signatures from signals on selected ones of the inputs of the source audio multiplexer 86 and the reference audio multiplexer 88. Accordingly, the signature correlation portion 70" may correlates reference audio signatures extracted from an audio output of the television receiver 22' to source audio signatures extracted from an audio output of the game 26, an audio output of the VCR 28, an audio output of the source scanning tuner 66, an audio output of the second VCR 94, and/or an audio output of the Direct Broadcast Satellite receiver 98, in order to determine whether the tuner of the television receiver 22', the game 26, the VCR 28, the second VCR 94, or the Direct Broadcast Satellite receiver 98 is the source of the signals being displayed by the television receiver 22'.

The output from the source audio multiplexer 86 is also connected directly through the multiplexer 112 and the digitizer 114' to the code reader 114". Similarly, the output from the reference audio multiplexer 88 is also connected directly through the multiplexer 118 and the digitizer 114' to the code reader 114". The code reader 114" extracts an ancillary code from a signal on a selected one of the inputs of the source audio multiplexer 86 and/or on a selected one of the inputs of the reference audio multiplexer 88.

The output from the reference video multiplexer 84 is also connected to a sync matching circuit 116 which compares the standard sync signal as sensed by the sync signal pickup 60 with the sync signals derived from the signal on a selected one of the inputs of the reference video multiplexer 84. The sync matching circuit 116 passes a match between the standard sync signal as sensed by the sync signal pickup 60 and a sync signal derived from the signal on a selected one of the inputs of the reference video multiplexer 84 to the digital signal processing module 71.

With this arrangement, a reference video signature extracted from a video output of the television receiver 22' may be compared to source video signatures extracted from a video output of the game 26, a video output of the VCR 28, a video output of the source scanning tuner 66, a video output of the second VCR 94, a video output of the Direct Broadcast Satellite receiver 98, and the like in order to determine the local source of the signals displayed by the television receiver 22'. Alternatively or in addition, a reference audio signature extracted from an audio output of the television receiver 22' may be compared to source audio signatures extracted from an audio output of the game 26, an audio output of the VCR 28, an audio output of the source scanning tuner 66, an audio output of the second VCR 94, an audio output of the Direct Broadcast Satellite receiver 98, and the like in order to determine the local source of the signals displayed by the television receiver 22'.

Because the correlation of signatures is computationally expensive, the digital signal processing module 71 may first control the reference video multiplexer 84 in order to pass the video signal on the video output 72 of the source scanning tuner 66 to the sync matching circuit 116 which matches suitable synchronization components of the video output of the source scanning tuner 66 and from the sync signal pickup 60. Until a match is found, the controller 68 causes the source scanning tuner 66 to sequentially tune to the possible signal sources.

When a match between synchronization components is found, the digital signal processing module 71 controls the source video multiplexer 82 in order to pass the video signal currently on the video output 72 of the source scanning tuner 66 to the video signal conditioner circuit 111, the multiplexer 112, and the signature extraction portion 70', and the digital signal processing module 71 controls the reference video multiplexer 84 in order to pass the video signal on the video output 100 (or 67) of the television receiver 22' to the video signal conditioner circuit 113, the multiplexer 118, and the signature extraction portion 70'. (The video signal conditioner circuit 113 is always bypassed when using the video signal from the video signal pickup 62.) The signature extraction portion 70' and the signature correlating portion 70" of the digital signal processor 70 extracts and correlates video signatures from the video signal corresponding to the channel selected by the source scanning tuner 66 and the video signal corresponding to a channel selected by the television receiver 22'. These channels are the channels that are in sync as determined by the sync matching circuit 116. If a match is not found, it may be concluded that the sync tested by the sync matching circuit 116 relates to different channels. Accordingly, the controller 68 steps the source scanning tuner 66 to the next channel to restart the process of finding synchronization and, if synchronization is found, of extracting and comparing video signatures. If a match of video signatures is found, the tuner of the television receiver 22' is identified as the local source of the signals displayed by the television receiver 22'.

Alternatively, when a match between synchronization components is found, the digital signal processing module 71 controls the source audio multiplexer 86 in order to pass the audio signal on the audio output 74 of the source scanning tuner 66 to the multiplexer 112 and the signature extraction portion 70', and the digital signal processing module 71 may control the reference audio multiplexer 88 in order to pass the audio signal on the audio output 108 (or the audio signal pickup 64) of the television receiver 22' to the multiplexer 118 and the signature extraction portion 70'. The signature extraction portion 70' and the signature correlating portion 70" of the digital signal processor 70 extracts and correlates audio signatures from the audio signal corresponding to the channel selected by the source scanning tuner 66 and the audio signal corresponding to a channel selected by the television receiver 22'. These channels are the channels that are in sync as determined by the sync matching circuit 116. If a match is not found, it may be concluded that the sync found by the sync matching circuit 116 relates to different channels. Accordingly, the controller 68 steps the source scanning tuner 66 to the next channel to restart the process of finding synchronization and, if synchronization is found, of extracting and comparing audio signatures. If a match of audio signatures is found, the tuner of the television receiver 22' is identified as the local source of the signals displayed by the television receiver 22'.

After a match is thus found, the identity of this signal source may be confirmed by reading an ancillary code, if present, from the video signal on the video output 72 of the source scanning tuner 66. It should be noted here that, if the video signal pickup 62 is used to derive a video signal from the television receiver 22', and if ancillary codes are inserted in the vertical blanking interval of video signals, the ancillary code cannot be read from the video signal on the video signal pickup 62 because, in many modern television sets, the vertical blanking interval is not present in video signal at the point where the video signal pickup 62 picks up the video signal. Accordingly, ancillary codes can instead be read from the video output 72 of the source scanning tuner 66 when the source scanning tuner 66 is tuned to the channel to which the television receiver 22' is tuned. However, if the video output 100 is used to derive a video signal from the television receiver 22', if the video output 100 is at baseband, and if ancillary codes are inserted in the vertical blanking interval of video signals, the ancillary code can be read from the video signal on the video output 100 because the vertical blanking interval is present in the baseband video signal. Alternatively, the identity of this signal source may be confirmed by reading an ancillary code, if present, from the audio signal on the audio output 74 of the source scanning tuner 66 or on the audio output 108 (or 64) of the television receiver 22'.

If signatures extracted from all of the channels to which the source scanning tuner 66 may be tuned do not match signatures extracted from the output of the television receiver 22', reference video and/or audio signatures extracted from a video and/or audio output of the television receiver 22' may be compared to source video and/or audio signatures extracted from a video and/or audio output of the game 26, from a video and/or an audio output of the VCR 28, from a video and/or an audio output of the second VCR 94, from a video and/or an audio output of the Direct Broadcast Satellite receiver 98, and the like in a similar manner in order to determine whether any of these local sources is the local source of the signals displayed by the television receiver 22'.

Figure 4:
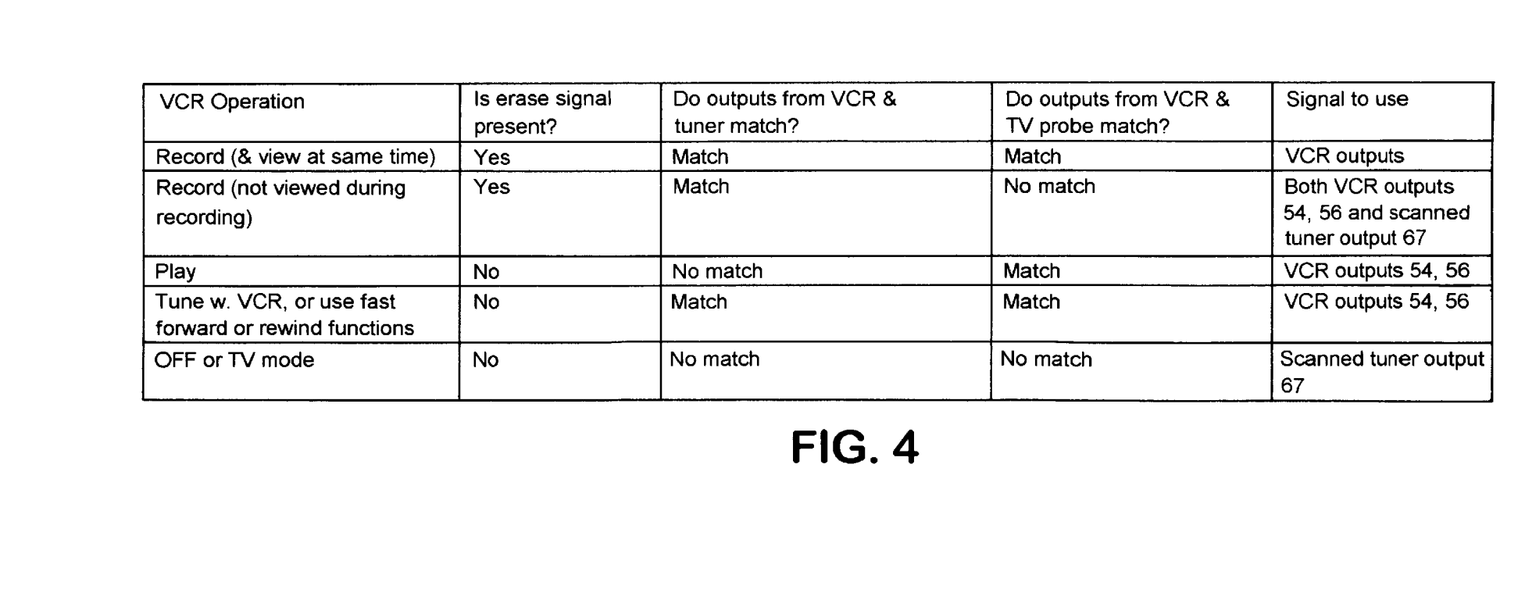

Also, various modes of the VCR 28 (and of the second VCR 94) can be determined by the arrangement of the present invention. FIG. 4 discloses in table form the operation of the present invention in order to monitor the modes of a VCR. As shown in FIG. 4, if the erase head of the VCR 28 is active, if the outputs of the VCR 28 and of the source scanning tuner 66 match, and if the outputs of the VCR 28 and of the television receiver 22' match, then it may be concluded that the VCR 28 is in the RECORD mode and that the program being recorded is also being viewed at the same time.

The operation of the erase head of the VCR 28 can be detected by the digital signal processing module 71 from a VCR erase detector 119 which is associated with the VCR 28. (Also, a VCR erase detector 120 may be associated with the second VCR 94.) The erase head detector 119 may be of the sort disclosed by Vitt et al. Alternatively, the code reader 114 may be arranged to detect an artifact of the erase signal of the VCR 28 from the VCR audio output 56 of the VCR 28 by use of either the source audio multiplexer 86 or the reference audio multiplexer 88.

In order to determine if the outputs of the VCR 28 and of the source scanning tuner 66 match, the video outputs of the VCR 28 and of the source scanning tuner 66 may be correlated. For example, the digital signal processing module 71 may control the source video multiplexer 82 in order to pass the video signal on the video output 72 to the video signal conditioner circuit 111, the multiplexer 112, and the signature extraction portion 70', and the digital signal processing module 71 may control the reference video multiplexer 84 in order to pass the video signal on the VCR video output 58 to the video signal conditioner circuit 113, the multiplexer 118, and the signature extraction portion 70'. The signature extraction portion 70' and the signature correlating portion 70" of the digital signal processor 70 extracts and correlates video signatures from a video signal corresponding to a channel selected by the source scanning tuner 66 and from a video signal corresponding to a channel selected by the VCR 28. If these video signatures do not match, the controller 68 may step the source scanning tuner 66 through each of the channels until a match is found.

Alternatively, the digital signal processing module 71 may control the source audio multiplexer 86 in order to pass the audio signal on the audio output 74 to the multiplexer 112 and the signature extraction portion 70', and the digital signal processing module 71 may control the reference audio multiplexer 88 in order to pass the audio signal on the VCR audio output 56 to the multiplexer 118 and the signature extraction portion 70'. The signature extraction portion 70' and the signature correlating portion 70" of the digital signal processor 70 extracts and correlates audio signatures from the audio signal corresponding to a channel selected by the source scanning tuner 66 and from the audio signal corresponding to a channel selected by the VCR 28. If these audio signatures do not match, the controller 68 may step the source scanning tuner 66 through each of the channels until a match is found.

In order to determine if the outputs of the VCR 28 and of the television receiver 22' match, the video outputs of the VCR 28 and of the television receiver 22' may be correlated. The correlation of the outputs of the VCR 28 and of the television receiver 22' also can be determined by the digital signal processing module 71. For example, the digital signal processing module 71 may control the source video multiplexer 82 in order to pass the video signal on the video output 100 from the television receiver 22' to the video signal conditioner circuit 111, the multiplexer 112, and the signature extraction portion 70', and the digital signal processing module 71 may control the reference video multiplexer 84 in order to pass the video signal on the video output 58 of the VCR 28 to the video signal conditioner circuit 113, the multiplexer 118, and the signature extraction portion 70'. The signature extraction portion 70' and the signature correlating portion 70" of the digital signal processor 70 extracts and correlates video signatures from the video signal corresponding to a channel selected by the VCR 28 and the video signal corresponding to a channel selected by the television receiver 22'.

Alternatively, the digital signal processing module 71 may control the source audio multiplexer 86 in order to pass the audio signal on the audio output 108 from the television receiver 22' to the multiplexer 112 and the signature extraction portion 70', and the digital signal processing module 71 may control the reference audio multiplexer 88 in order to pass the audio signal on the audio output 56 of the VCR 28 to the multiplexer 118 and the signature extraction portion 70'. The signature extraction portion 70' and the signature correlating portion 70" of the digital signal processor 70 extracts and correlates audio signatures from the audio signal corresponding to a channel selected by the VCR 28 and the audio signal corresponding to a channel selected by the television receiver 22'.

If the television receiver 22' does not have output jacks so that the video output 100 and the audio output 108 are not present and so that the video signal pickup 62 and the audio signal pickup 64 are instead used to sense the video and audio signals of the television receiver 22', signatures from the video signals on the video output 58 of the VCR 28 and on the video signal pickup 62 of the television receiver 22' may be correlated in the manner described above, or signatures from the audio signals on the audio output 56 of the VCR 28 and on the audio signal pickup 64 of the television receiver 22' may be correlated in the manner described above.

As also shown in FIG. 4, if the erase head of the VCR 28 is active, if the outputs of the VCR 28 and of the source scanning tuner 66 match, and if the outputs of the VCR 28 and of the television receiver 22' do not match, then it may be concluded that the VCR 28 is in the RECORD mode, but that the program being recorded is not also being viewed on the television receiver 22' at the same time. The operation of the erase head of the VCR 28 can be detected as described above, the outputs of the VCR 28 and of the source scanning tuner 66 can be correlated as described above in order to determine that they match, and the outputs of the VCR 28 and of the television receiver 22' can be correlated as described above in order to determine that they do not match.

As shown in FIG. 4, if the erase head of the VCR 28 is not active, if the outputs of the VCR 28 and of the source scanning tuner 66 do not match, and if the outputs of the VCR 28 and of the television receiver 22' do match, then it may be concluded that the VCR 28 is in the PLAY mode. The operation of the erase head of the VCR 28 can be detected as described above, the outputs of the VCR 28 and of the source scanning tuner 66 can be correlated as described above in order to determine that they do not match, and the outputs of the VCR 28 and of the television receiver 22' can be correlated as described above in order to determine that they do match.

Again as shown in FIG. 4, if the erase head of the VCR 28 is not active, if the outputs of the VCR 28 and of the source scanning tuner 66 match, and if the outputs of the VCR 28 and of the television receiver 22' match, then it may be concluded that the VCR 28 is not recording or playing, but is instead being used to tune the television receiver 22', to fast forward a cassette (or tape), or to rewind a cassette (or tape). The use of the VCR 28 as a tuner may be credited by the program signal source detector 44. The operation of the erase head of the VCR 28 can be detected as described above, the outputs of the VCR 28 and of the source scanning tuner 66 can be correlated as described above in order to determine that they match, and the outputs of the VCR 28 and of the television receiver 22' can be correlated as described above in order to determine that they match.

As finally shown in FIG. 4, if the erase head of the VCR 28 is not active, if the outputs of the VCR 28 and of the source scanning tuner 66 do not match, and if the outputs of the VCR 28 and of the television receiver 22' also do not match, then it may be concluded that the VCR 28 is off. The operation of the erase head of the VCR 28 can be detected as described above, the outputs of the VCR 28 and of the source scanning tuner 66 can be correlated as described above in order to determine that they do not match, and the outputs of the VCR 28 and of the television receiver 22' can be correlated as described above in order to determine that they do not match. The digital signal processing module 71 may determine the on or off state of the television receiver 22' by detecting the presence or loss of a sync signal on the sync signal pickup 60.

Also, the arrangement of FIG. 3 may be used to identify programs being played by the VCR 28 or being displayed by the television receiver 22'. For example, video and/or audio program identifying ancillary codes contained in the program signal being recorded by the VCR 28 may be read by the code correlating portion 114" and may be stored in a memory of the digital signal processing module 71. The stored video and/or audio program identifying ancillary codes can be compared with those read by the code correlating portion 114" during the subsequent PLAY mode of the VCR 28 in order to determine if and when the recorded program signal is played back. The video and/or audio program identifying ancillary codes read by the code correlating portion 114" during either the RECORD mode or the subsequent PLAY mode of the VCR 28 may also be used to identify the programs being played in accordance with the teachings of the aforementioned U.S. Pat. No. 5,481,294.

If video and/or audio program identifying ancillary codes are not present in the signals being recorded and/or played, characteristic video and/or audio program signatures of the program signal being recorded by the VCR 28 may be extracted by the signature extraction portion 70' and may be stored in the memory of the digital signal processing module 71. The stored characteristic video and/or audio signatures can be compared by the signature correlating portion 70" with those extracted by the signature extraction portion 70' during a subsequent PLAY mode in order to determine if and when the recorded program signal is played back. If a match is found, the signatures extracted during play or recording may be compared to known signatures previously extracted from known programs by the local metering site 16 or by the source scanning tuner 66 in order to identify the recorded and/or played program in accordance with the teachings of the aforementioned U.S. Pat. No. 5,481,294.

Similarly, video and/or audio program identifying ancillary codes of a program signal tuned by the tuner of the television receiver 22' may be read by the code correlating portion 114" at the video and/or audio outputs of the television receiver 22'. The video and/or audio program identifying ancillary codes may be used to identify the programs displayed by the television receiver 22' in accordance with the teachings of the aforementioned U.S. Pat. No. 5,481,294. If video and/or audio program identifying ancillary codes are not present in the signals at the output of the television receiver 22', characteristic video and/or audio program signatures of the program signal at the output of the television receiver 22' may be extracted by the signature extraction portion 70'. These signatures may be compared to known signatures previously extracted from known programs by the local metering site 16 or by the source scanning tuner 66 in order to identify the displayed program in accordance with the teachings of the aforementioned U.S. Pat. No. 5,481,294.

Programs being recorded and/or played by the second VCR 94, games from the video game 26 being displayed by the television receiver 22', and programs from the Direct Broadcast Satellite receiver 98 being displayed by the television receiver 22', may be similarly identified through the use of program identifying ancillary codes and characteristic program signatures. It should be noted, however, that the playing of rented or purchased cassettes (or tapes) is often more common than playing back time-shifted, previously recorded programs. Accordingly, it is expected that most attempts to use characteristic program signatures in order to identify programs being played on the VCR 28 will fail to yield an identifying match. However, program identifying ancillary codes are frequently added to pre-recorded cassettes (or tapes) so that, in those cases, the program signal source detector 44 installed in the statistically selected household 14 will still be able to identify the program being played by the VCR 28.

Certain modifications of the present invention have been discussed above. Other modifications will occur to those practicing in the art of the present invention. For example, although the present invention has been specifically described in connection with a television audience measurement system, the present invention may be used in connection with other systems such as program verification systems.

Also, although the present invention has been described in connection with the monitoring of television receivers, the present invention may be used in connection with the monitoring of other receivers, such as radio receivers.

Similarly, although the present invention has been described in connection with monitoring VCRs, the present invention may be used in connection with monitoring other recording and/or playing equipment such as disk players, audio cassette and disk recorders/players, and the like, and in connection with signal sources that are less complex than VCRs and like equipment.

Moreover, as described above, the signature correlating portion 70" of the digital signal processor 70 and the code correlating portion 114" of the code reader 114 are located in the statistically selected household 14. However, the signature correlating portion 70" and the code correlating portion 114" instead may be located in the central site 18.

Furthermore, as described above, signatures are extracted from an output of the television receiver 22' and from an output of a local source of program signals, and these signatures are correlated in order to identify the source as the source of the signals being displayed by the television receiver 22'. These signatures may be exact analog or digital representations of the relevant programs signals so that the output of the television receiver 22' and the output of a source to be identified as the source of the program signals being displayed by the television receiver 22' may be directly correlated either in analog form or in digital form without the necessity of sampling the program signals. Alternatively, the signatures may be sampled representations of the relevant programs signals.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system for determining an operating mode of a recording/playing device, wherein the recording/playing device generates a recording indicating signal during recording and operates in conjunction with a receiver, and wherein the system comprises:

tuning means, separate from a tuner of the receiver, for tuning to a program signal;

first signal acquiring means for acquiring a first signal from an output of the recording/playing device;

second signal acquiring means for acquiring a second signal from an output of the tuning means;

third signal acquiring means for acquiring a third signal from an output of the receiver;

fourth signal acquiring means for acquiring the recording indicating signal; and, determining means coupled to the first, second, third, and fourth signal acquiring means for determining an operating mode of the recording/playing device dependent upon the first, second, and third signals and the recording indicating signal.

2. The system of claim 1 wherein the determining means comprises means for determining that the recording/playing device is in a recording operating mode and that a program being recorded is in control of the receiver if the recording indicating signal is present, if the first and second signals match, and if the first and third signals match.

3. The system of claim 1 wherein the determining means comprises means for determining that the recording/playing device is in a recording operating mode and that a program being recorded is not in control of the receiver if the recording indicating signal is present, if the first and second signals match, and if the first and third signals do not match.

4. The system of claim 1 wherein the determining means comprises means for determining that the recording/playing device is in a playing operating mode if the recording indicating signal is not present, if the first and second signals do not match, and if the first and third signals match.

5. The system of claim 1 wherein the determining means comprises means for determining that the receiver is being tuned with the recording/playing device or that the recording/playing device is in a fast forward state or that the recording/playing device is in a rewind state if the recording indicating signal is not present, if the first and second signals match, and if the first and third signals match.

6. The system of claim 1 wherein the determining means comprises means for determining that the recording/playing device is in an off operating mode or that the recording/playing device is in a receiver operating mode if the recording indicating signal is not present, if the first and second signals do not match, and if the first and third signals do not match.

7. The system of claim 1 wherein the first, second, and third signals comprise signatures.

8. The system of claim 7 wherein the signatures are video signatures.

9. The system of claim 7 wherein the signatures are audio signatures.

10. A system for measuring the use of a video recorder operably connected to a television receiver, the television receiver receiving a plurality of corresponding transmitted television signals, the system comprising:

source tuning means for tuning to a source program signal corresponding to a transmitted television signal;

television receiver signal acquiring means for acquiring a signal displayed on the television receiver;

first comparing means for comparing a signal from the video recorder to the source program signal; and, second comparing means for comparing the signal from the video recorder to the signal acquired by the television receiver signal acquiring means.

11. The system of claim 10 further comprising determining means for determining that the video recorder is in a recording operating mode and that a program being recorded is in control of the television receiver if the signal from the video recorder and the source program signal match and if the signal from the video recorder and the signal acquired by the television receiver signal acquiring means match.

12. The system of claim 10 further comprising determining means for determining that the video recorder is in a recording operating mode and that a program being recorded is not in control of the television receiver if the signal from the video recorder and the source program signal match and if the signal from the video recorder and the signal acquired by the television receiver signal acquiring means do not match.

13. The system of claim 10 further comprising determining means for determining that the video recorder is in a play operating mode if the signal from the video recorder and the source program signal do not match and if the signal from the video recorder and the signal acquired by the television receiver signal acquiring means match.

14. The system of claim 10 wherein the television receiver signal acquiring means is a non-intrusive television receiver signal acquiring means.

* * * * *